(12) United States Patent
Cowtan

(10) Patent No.: US 9,342,275 B2
(45) Date of Patent: *May 17, 2016

(54) SYSTEM AND METHOD FOR AUTOMATICALLY DECLARING VARIABLES

(71) Applicant: International Business Machines Corporation, Armonk, NY (US)

(72) Inventor: Mark Gregory Cowtan, Oshawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,199

(22) Filed: Jun. 25, 2014

(65) Prior Publication Data

US 2014/0310685 A1   Oct. 16, 2014

Related U.S. Application Data

(63) Continuation of application No. 12/125,152, filed on May 22, 2008, now Pat. No. 8,799,856.

(30) Foreign Application Priority Data

Jun. 12, 2007  (CA) ..................................... 2591361
Jun. 12, 2007  (CA) ..................................... 2591382

(51) Int. Cl.
  *G06F 9/44*   (2006.01)
  *G06F 9/45*   (2006.01)

(52) U.S. Cl.
  CPC .. *G06F 8/30* (2013.01); *G06F 8/33* (2013.01); *G06F 8/44* (2013.01)

(58) Field of Classification Search
  None
  See application file for complete search history.

(56) References Cited

U.S. PATENT DOCUMENTS 5,717,924 A   2/1998   Kawai
5,748,975 A   5/1998   Van De Vanter
(Continued)

FOREIGN PATENT DOCUMENTS

WO   2006057781 A2   6/2006

OTHER PUBLICATIONS

Microsoft, "Redeclaration of typedef Names", 2005, Microsoft Developer Network, https://msdn.microsoft.com/en-us/library/87txds41(v=vs.80).aspx, Retrieved May 3, 2015.*

(Continued)

*Primary Examiner* — Li B Zhen
*Assistant Examiner* — Joanne Macasiano
(74) *Attorney, Agent, or Firm* — George R. McGuire; Bond Schoeneck & King, PLLC; John Pivnichny

(57) ABSTRACT

A system and method for declaring variables during coding of a software program. The method includes, for each variable type, defining a unique string representing a variable declaration instruction and adapting a coding module wherein, generating code for the corresponding variable declaration statement for a new variable having the new variable name and the specified variable type, tracking the variable declaration instructions for each new variable name, and presenting a warning if a programmer attempts to use one of the previously used variable names to declare a new variable name of another data type. The method further includes defining a reserved variable declaration area in the software program and placing any code generated by the coding module for the variable declaration statement into the reserved variable declaration area. Each unique string representing a variable declaration instruction may be, for example, a prefix or suffix.

16 Claims, 11 Drawing Sheets

(56) References Cited

U.S. PATENT DOCUMENTS

| | | | |
|---|---|---|---|
| 6,014,670 | A | 1/2000 | Zamanian et al. |
| 6,125,442 | A | 9/2000 | Maves et al. |
| 6,154,876 | A | 11/2000 | Haley et al. |
| 6,233,726 | B1 | 5/2001 | Bowman et al. |
| 6,286,104 | B1 | 9/2001 | Buhle et al. |
| 6,339,775 | B1 | 1/2002 | Zamanian et al. |
| 6,374,403 | B1 | 4/2002 | Darte et al. |
| 6,389,588 | B1 | 5/2002 | Wadhwa et al. |
| 6,507,947 | B1 | 1/2003 | Schreiber et al. |
| 6,631,328 | B2 | 10/2003 | Haugland |
| 6,681,386 | B1 | 1/2004 | Amin et al. |
| 7,143,101 | B2 | 11/2006 | Oliver et al. |
| 7,434,205 | B1 | 10/2008 | Steenhagen et al. |
| 7,437,709 | B2 | 10/2008 | Salter |
| 8,589,872 | B2 | 11/2013 | Cowtan |
| 2002/0049698 | A1 | 4/2002 | Aoyama |
| 2002/0184611 | A1 | 12/2002 | Endejan |
| 2002/0199173 | A1* | 12/2002 | Bowen ............ 717/129 |
| 2003/0046658 | A1 | 3/2003 | Raghavan et al. |
| 2003/0056192 | A1 | 3/2003 | Burgess |
| 2004/0006765 | A1* | 1/2004 | Goldman ............ 717/116 |
| 2005/0149907 | A1 | 7/2005 | Seitz et al. |
| 2005/0278697 | A1 | 12/2005 | Hodge |
| 2006/0005169 | A1 | 1/2006 | Berstis et al. |
| 2006/0036997 | A1 | 2/2006 | Low |
| 2006/0048095 | A1 | 3/2006 | Meijer et al. |
| 2006/0221747 | A1 | 10/2006 | Slavin et al. |
| 2007/0005342 | A1* | 1/2007 | Ortscheid ............ 704/9 |
| 2007/0041041 | A1 | 2/2007 | Engbrocks et al. |
| 2007/0079267 | A1 | 4/2007 | Hong et al. |
| 2007/0266378 | A1 | 11/2007 | Fukuda |
| 2008/0313608 | A1 | 12/2008 | Cowtan |
| 2010/0131925 | A1 | 5/2010 | Gutfleisch |

OTHER PUBLICATIONS

Office Action (Mail Date Sep. 12, 2012) for U.S. Appl. No. 12/125,291, filed May 22, 2008; Confirmation No. 4271; pp. 1-33.
Amendment Filed Dec. 10, 2012 in response to Office Action (Mail Date Sep. 12, 2012) for U.S. Appl. No. 12/125,291, filed May 22, 2008; Confirmation No. 4271; pp. 1-34.
Notice of Allowance and Fee(s) Due (Mail Date Jan. 4, 2013) for U.S. Appl. No. 12/125,291, filed May 22, 2008; Confirmation No. 4271; pp. 1-16.
Notice of Allowance and Fee(s) Due (Mail Date Jul. 12, 2013) for U.S. Appl. No. 12/125,291, filed May 22, 2008; Confirmation No. 4271, pp. 1-19.
Sward, et al., Copyright 2004 Association for Computing Machinery, Re-engineering Global Variables in Ada, p. 29-33, SIGAda 2004, Nov. 14-18, 2004, Atlanta, GA, USA.
Barreto De Oliveira, Copyright 2004, The boo Programming Language, pp. 1-8.
4 Using MySQL Programs, http://www.browardphp.com/mysql_manual_en/manual_Using_MySQL_Programs.html, as of Feb. 7, 2008, pp. 1-9.
5 Database Administration, http://www.browardphp.com/mysql_manual_en/manual_MySQL_Databasek_Administration . . . , as of Feb. 7, 2008, pp. 1-145.
6 Replication in MySQL, http://www.browardphp.com/mysql_manual_en/manual_Replication.html, as of Feb. 7, 2008, pp. 1-31.
U.S. Appl. No. 12/125,152-PDF.

* cited by examiner

```
DO
    LINE INPUT #FileNum, MyLine
    form1.cboList.Add MyLine
    CounterNum = CounterNum +1
LOOP WHILE NOT EOF(FileNum)
```
— 202

FIG. 2A       — 200A

```
DIM FileNum as LONG
DIM MyLine as STRING
DIM CounterNum as INTEGER
```
— 204

```
...

DO
    LINE INPUT #FileNum, MyLine
    form1.cboList.Add MyLine
    CounterNum = CounterNum +1
LOOP WHILE NOT EOF(FileNum)
```
— 202

FIG. 2B       — 200B

SYSTEM AND METHOD FOR AUTOMATICALLY DECLARING VARIABLES

REFERENCE TO RELATED APPLICATIONS

This application is a continuation of U.S. patent application Ser. No. 12/125,152 filed May 22, 2008 and entitled "System And Method For Automatically Declaring Variables," which claims priority to Canadian Patent Application Nos. 2591361 filed on Jun. 12, 2007, and 2591382, filed on Jun. 12, 2007, the contents of which are hereby incorporated herein their entireties. This application also relates to U.S. patent application Ser. No. 12/125,291, filed on May 22, 2008, now U.S. Pat. No. 8,589,872.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND OF THE INVENTION

The present invention relates to systems and methods for declaring variables.

While diligently declaring variables when coding a software program may be good programming practice, it can be a burdensome, slow and disjointed process for programmers. As a result, programmers may avoid declaring variables if they feel that they can keep track of all of them in a shorter piece of code. However, without properly declaring variables, programmers may experience problems with malfunctioning code due to misuse of variables or by assigning incorrect data type values to a variable.

There have been some previous attempts at automating variable declarations to decrease the burden for programmers. For example, an integrated development environment (IDE) shell may be configured to recognize variables in data processor readable code based on their context or location. In this illustrative example, an IDE coding module may look at function calls made within a data processor readable program to identify variables being passed, and declare the variables found in the function calls. However, in declaring the variables, the IDE coding module will have to guess at the type of variable being passed in the function call based on the assigned data. It is possible that the guess may be wrong, and thus, the variable may be declared incorrectly. This can cause the code to execute with seemingly random results or to crash completely.

What is needed is an improved system and method for declaring variables.

SUMMARY

The present invention relates to a system and method for declaring variables.

In one aspect, there is provided a method of declaring variables during coding of a software program. For each variable type, the method involves defining a unique string representing a variable declaration instruction and adapting a coding module such that, when a string representing a variable declaration instruction is typed adjacent to a new variable name, the coding module automatically generates code for the corresponding variable declaration statement for a new variable having the new variable name and the specified variable type.

In an embodiment of the method, the method involves defining a reserved variable declaration area in the software program and placing any code generated by the coding module for the variable declaration statement into the reserved variable declaration area.

In another embodiment, the method includes configuring the coding module to order any variable declaration statements placed into the reserved variable declaration area by at least one of variable name and variable type.

In yet another embodiment, the method includes defining each unique string representing a variable declaration instruction as a prefix or suffix that may be typed adjacent to the new variable name.

In still another embodiment, the method includes tracking the variable declaration instructions for each new variable name and warning the programmer if the programmer attempts to use the same variable name to declare a new variable name of another data type.

In another embodiment, the method includes configuring the coding module to allow a programmer to define the unique string representing a variable declaration instruction.

In still a further embodiment, the method includes programming a programmable key to generate the unique string representing the variable declaration instruction for each variable type.

In another aspect of the invention, there is provided a system for declaring variables during coding of a software program, wherein the system includes a means for defining, for each variable type, a unique string representing a variable declaration instruction, and a coding module adapted to automatically generate code for a corresponding variable declaration statement when a string representing a variable declaration instruction is typed adjacent to a new variable name.

In an embodiment of the system, the system includes a means for defining a reserved variable declaration area in the software program and a means for placing any code generated by the coding module for the variable declaration statement into the reserved variable declaration area.

In another embodiment, the coding module is further configured to order any variable declaration statements placed into the reserved variable declaration area by at least one of variable name and variable type.

In yet another embodiment, the system comprises means for defining each unique string representing a variable declaration instruction as a prefix or suffix that may be typed adjacent to the new variable name.

In another embodiment, the coding module is configured to track the variable declaration instructions for each new variable name and warn the programmer if the programmer attempts to use the same variable name to declare a new variable name of another data type.

In yet another embodiment, the coding module is configured to allow a programmer to define the unique string representing a variable declaration instruction.

In still another embodiment, the coding module is adapted to program a programmable key to generate the unique string representing the variable declaration instruction for each variable type.

In another aspect of the invention, there is provided a data processor readable medium storing data processor code that, when loaded into a device, adapts the device to perform a method of declaring variables during coding of a software program, the data processor readable medium including code for each variable type, defining a unique string representing a variable declaration instruction and code for adapting a coding module such that, when a string representing a variable declaration instruction is typed adjacent to a new variable name, the coding module automatically generates code for the corresponding variable declaration statement for a new variable having the new variable name and the specified variable type.

In an embodiment of the data processor readable medium, the data processor readable medium includes code for defining a reserved variable declaration area in the software program and code for placing any code generated by the coding module for the variable declaration statement into the reserved variable declaration area.

In another embodiment, the data processor readable medium includes code for configuring the coding module to order any variable declaration statements placed into the reserved variable declaration area by at least one of variable name and variable type.

In a further embodiment, the data processor readable medium comprises code for defining each unique string representing a variable declaration instruction as a prefix or suffix that may be typed adjacent to the new variable name.

In still a further embodiment, the data processor readable medium includes code for tracking the variable declaration instructions for each new variable name and code for warning the programmer if the programmer attempts to use the same variable name to declare a new variable name of another data type.

In yet another embodiment, the data processor readable medium includes code for configuring the coding module to allow a programmer to define the unique string representing a variable declaration instruction.

These and other aspects of the invention will become apparent from the following more particular descriptions of exemplary embodiments.

BRIEF DESCRIPTION OF THE DRAWINGS

In the figures which illustrate exemplary embodiments of the invention:

FIGS. 2A to 2G show an illustrative example of declaring variables in accordance with an embodiment;

DETAILED DESCRIPTION

As noted above, the present invention relates to a system and method for declaring variables.

Figure 1:
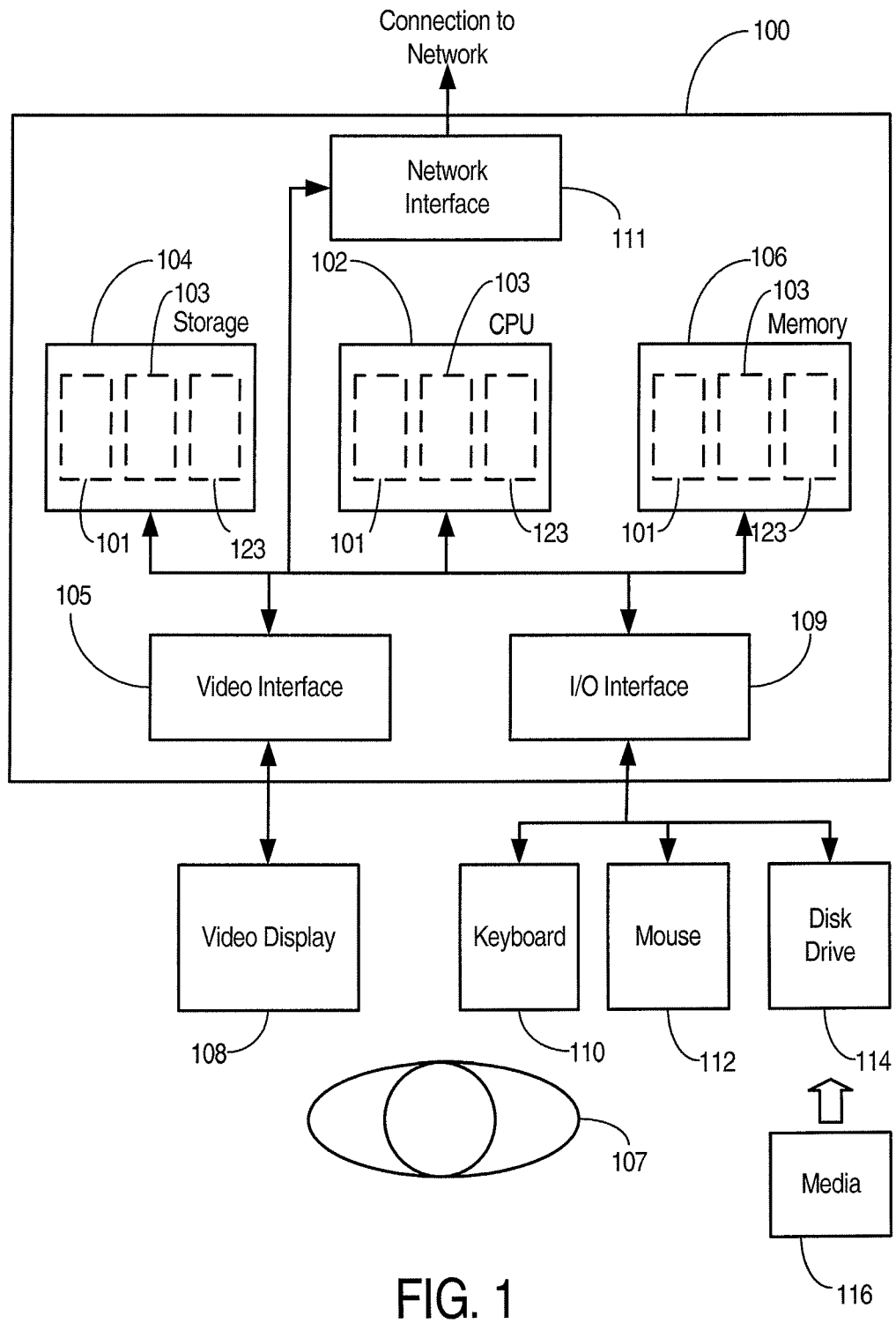
FIG. 1 shows a generic data processing system that may provide a suitable operating environment.

The invention may be practiced in various embodiments. A suitably configured data processing system, and associated communications networks, devices, software and firmware may provide a platform for enabling one or more of these systems and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Now referring to FIGS. 2A to 2G, shown is an illustrative example of a system for declaring variables in accordance with an embodiment.

As shown in window 200A of FIG. 2A, a programmer may be coding a software program 202 when a need arises to declare some newly introduced variables. Conventionally, the programmer would declare the new variables by using declaration statements 204 near the beginning of the code, as shown by way of example in window 200B of FIG. 2B. In an illustrative example, using the Microsoft Visual Basic™ DIM statement, the FileNum variable may be declared as having a "LONG" variable type, the MyLine variable may be declared as having a "STRING" variable type; and CounterNum variable may be declared as having an "INTEGER" variable type. As noted earlier, the need to manually declare variables in this manner may add a significant burden on the programmer.

Figure 2C:
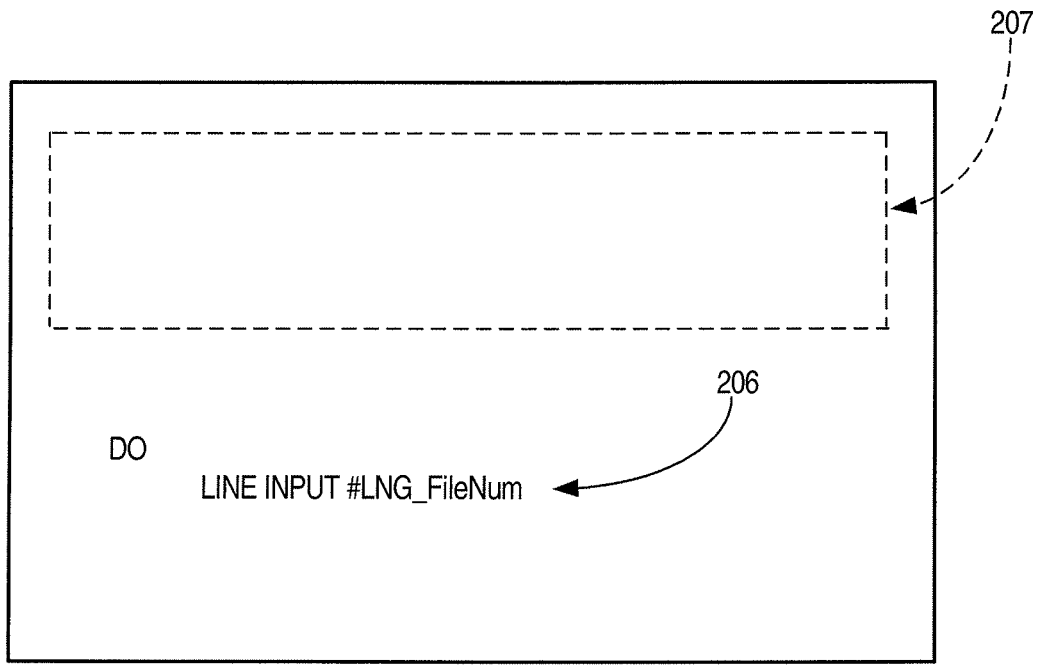

Now referring to window 200C of FIG. 2C, shown is an illustrative example of a variable declaration made using an IDE coding module (e.g. as embodied in application program 103 of FIG. 1) in accordance with an embodiment. As shown, in this illustrative embodiment, the IDE coding module may be configured to recognize a unique prefix or string of text as a variable declaration instruction. For example, the IDE coding module may be configured such that if a programmer types a predefined prefix or a string adjacent to (e.g. in front of or after) a variable name, such as shown in line 206, the IDE coding module will automatically declare the variable with a variable type and insert this declaration statement into a reserved variable declaration area, such as shown at 207.

Figure 2D:
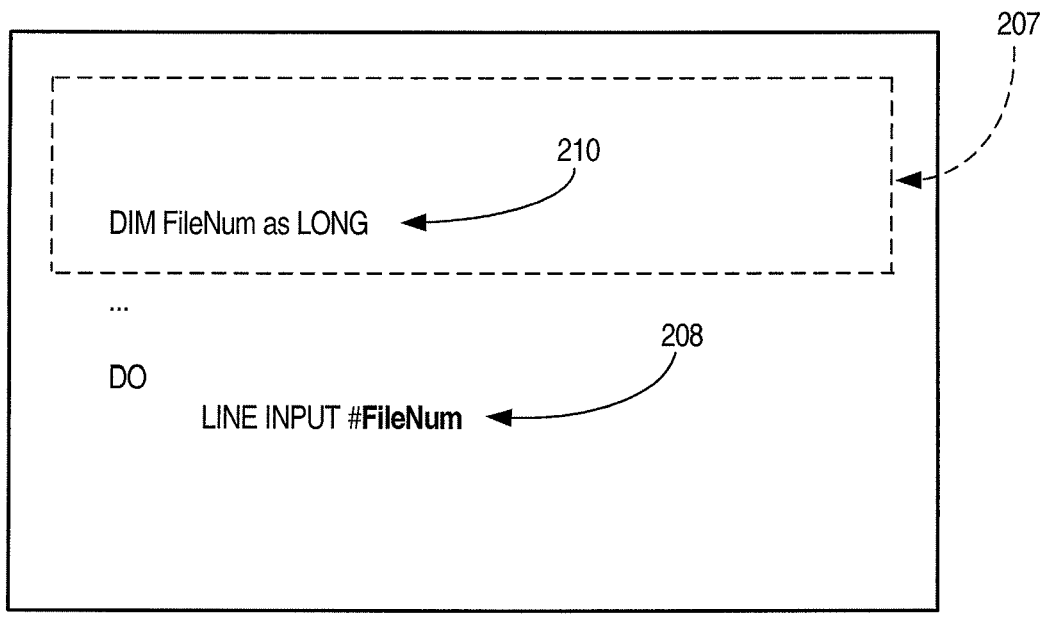

For example, as shown in window 200D of FIG. 2D if a programmer declares a new variable named "FileNum" of a LONG type, the programmer may simply type "LNG_FileNum" on a line, as shown at line 206, and the IDE coding module would then recognize "FileNum" appearing after the unique "LNG_" prefix or string as a command for a new variable of a LONG type to be declared. The IDE coding module may be configured to display this newly declared variable simply as "FileNum" as shown at line 208, and also generate the following declaration statement: "DIM FileNum as LONG" and write the statement into the reserved variable declaration area 207, as shown at line 210.

If the code is in fact lengthy, it will be appreciated that the reserved variable declaration area 207 may be entirely outside the viewing area of window 200D. However, the fact that the variable declaration instruction has been accepted and that "FileNum" is now recognized by the IDE coding module as a variable may be indicated, for example, by displaying "FileNum" in a different color or font, or in some other visually distinctive way. Once this is done, the IDE coding module may be configured to recognize all further instances of FileNum as being a reference to the declared variable.

Figure 2E:
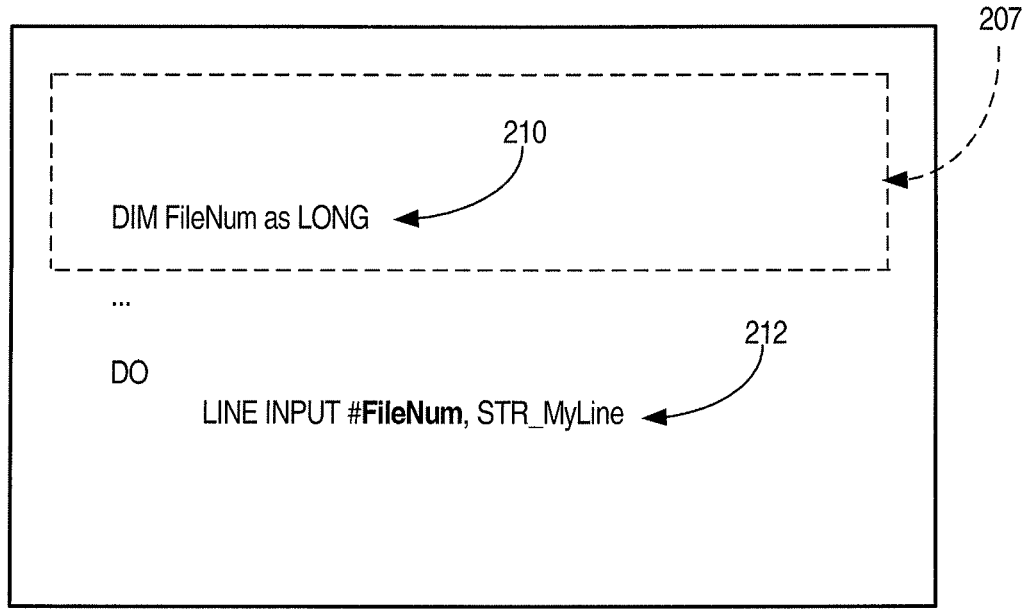

Continuing with this illustrative example, as shown in window 200E of FIG. 2E, the programmer may enter another string such as "STR_MyLine" on line 212. The IDE coding module may be configured to interpret this string as a command for a new variable "MyLine" of a STRING type to be declared. The IDE coding module may then generate the following statement "DIM MyLine as STRING" for placement into the reserved variable declaration area 207, as shown at line 216. Again, once MyLine is recognized as being a declared variable, the IDE coding module may be configured to display the variable MyLine in some visually distinctive way, such as color or font. The IDE coding module may then be configured to recognize all further instances of MyLine as a reference to the declared variable.

Figure 2F:
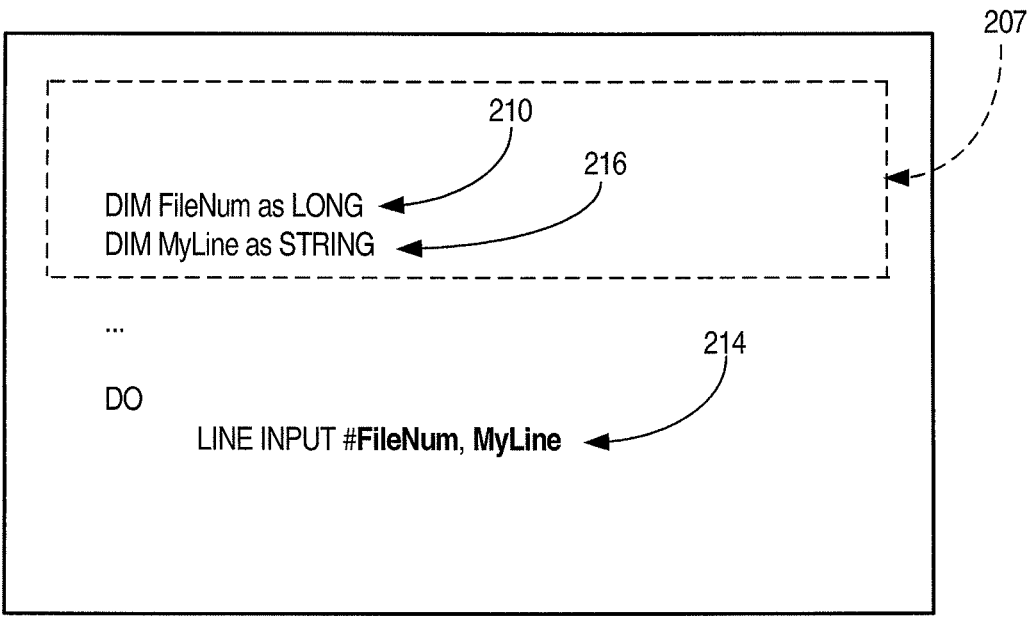

Now referring to FIG. 2F, when the new variable declaration statement for "MyLine" is added to the reserved area 207, as shown at line 216, the new declaration statement may be listed in the order added. In this example, it will be appreciated that the variable declaration statements may be added to the reserved area 207 in an ordered manner, such as by variable name, by variable type, or both. Thus, if ordered by variable name, and the second added variable declaration statement had a variable name starting with "A", the second added variable declaration statement would instead have been placed above the first added variable declaration statement. In this manner, if many variable declaration statements are added to the reserved area 207, it will be easier to locate a particular one.

Thus, an IDE coding module may be configured to interpret a relatively short string such as "LNG_" and "STR_" in order to execute a command to declare a variable having a LONG type or STRING type, respectively. Similarly, a short string such as "INT_" could be interpreted by the IDE coding module to automatically declare a new variable having an INTEGER type. In an alternative embodiment, the IDE coding module may be configured to allow the programmer himself to define the strings that he would like to use for declaring the variables. In this manner, the programmer may personalize the variable declaration instruction so that it is most convenient for him.

Figure 2G:
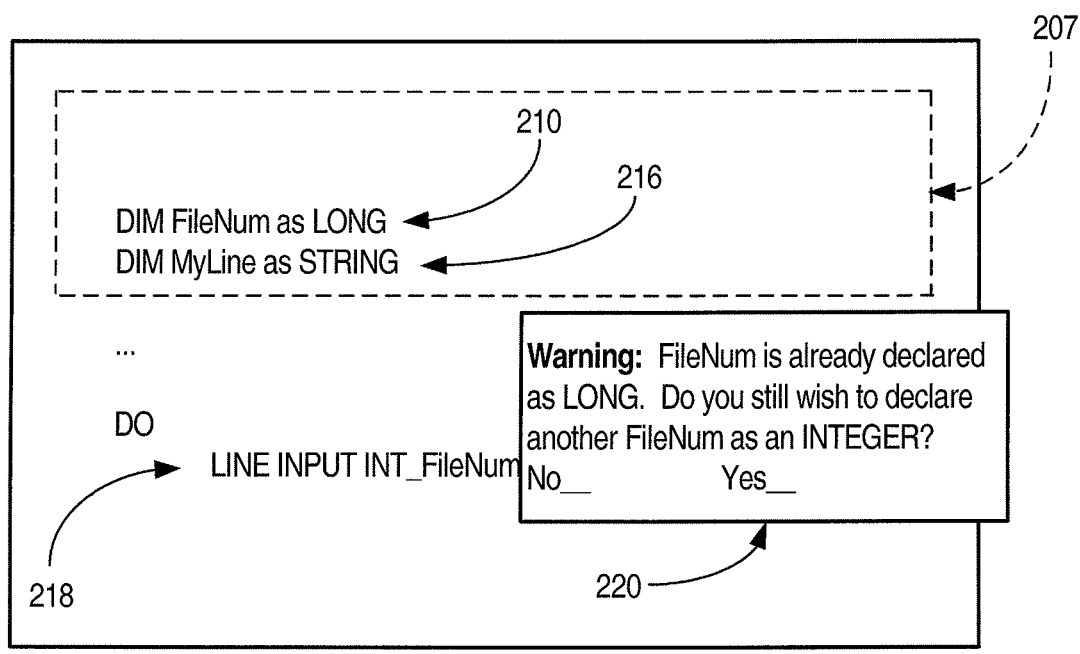

In another embodiment, as shown in FIG. 2G, if a programmer attempts to declare the same variable name as a different type, the IDE coding module may provide a warning to the programmer that the variable is already in use as a different variable type. For example, if the programmer attempts to declare the variable FileNum as an INTEGER using "INT_FileNum", the IDE coding module may be configured to warn the programmer using a pop-up window 220, or a message in a defined message field (not shown) that FileNum is already in use as a declared variable of a LONG type. The warning message may then provide the user with an option to continue to use the same variable name with a different variable type.

Thus, unless the IDE coding module is enabled to do so, and the programmer deliberately chooses to have two variables of the same name but different type or scope, the warning message would prompt the programmer to choose another variable name that is not already defined and in use.

In another embodiment, the IDE coding module may be configured to allow a programmer to define a set of strings which may be interpreted as the variable declaration action commands. For example, if a programmer prefers to use the full "STRING_" as a prefix or string instead of "STR_", they could specify this preference in a user interface configured for this purpose. However, it will be appreciated that shorter strings such as "STR_" will be more efficient to type and use.

In an alternative embodiment, it will be appreciated that programmable function keys on a keyboard 110 may be programmed to enter prefix strings such as "STR_", "INT_", "LNG_" etc. using a single keystroke. This may make the declaration of variables even more efficient, as the variable declaration process may be initiated using as few as one extra keystroke of a programmable key.

By configuring the IDE coding module to recognize and automatically declare variables based on a minimal number of keystrokes such as described above, a significant amount of tedious work in declaring variables may be eliminated. As declaring variables may be made significantly easier, programmers may be more likely to diligently declare all variables, thus reducing coding errors due to incorrect declaration or misuse of variables. The benefits of this approach to declaring variables will be particularly noticeable in software programs which are lengthy, and which may use many different variables.

Now referring to FIGS. 3A to 3G, shown is an illustrative example of a system for identifying variable types in accordance with an embodiment. As described above with respect to FIGS. 2A to 2G, an IDE coding module may be configured to recognize when a variable is being declared and the type of variable that is being declared by interpreting a prefix string, such as "STR_", "LNG_", and "INT_". However, once the variables have been declared, and particularly if there are many variables to keep track of, a programmer may forget the type and scope of a variable when trying to use it later on.

While some programmers may attempt to identify a variable type by using a descriptive prefix or suffix, if the variable is used often within a piece of code, the programmer may be required to repeatedly type the descriptive prefix or suffix many, many times. Even with programmable keys programmed to enter a descriptive prefix, over the course of perhaps dozens or hundreds of variables, used many times within a piece of code, there may be significant keystroke overhead for the programmer.

Thus, in order to provide programmers with a more efficient way of identifying the type of declared variables, the inventor proposes identification of a variable type and the scope of a variable by using a variable type identifier tag, such as a subscript and/or superscript letter, or a suitable graphic symbol, that is automatically attached to the variable name once declared.

Figure 3A:
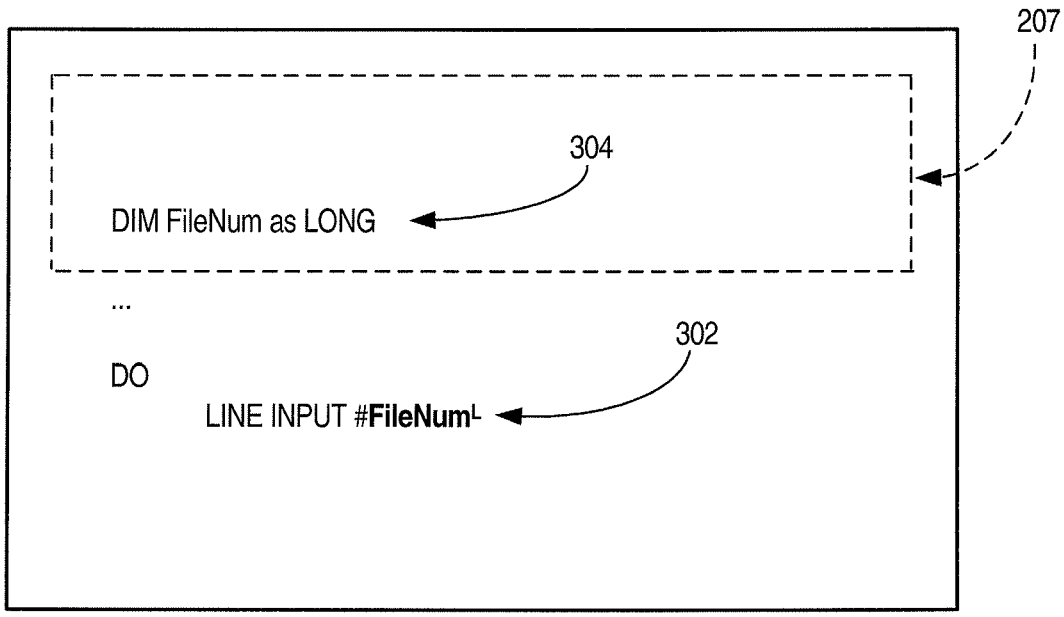
FIGS. 3A to 3G show an illustrative example of identifying variable types in accordance with an embodiment.

FIG. 3A shows an illustrative example of an IDE coding module window 300A in which the type of a declared variable is easily identified by the use of a subscript and/or superscript tag. For example, if the programmer is declaring a new variable FileNum of a LONG type, the programmer may declare the new variable in a manner similar to that described earlier with reference to FIGS. 2A to 2G, such as by entering "LNG_FileNum" on a line. As noted earlier, the IDE coding module may be configured to interpret this string as instructions to declare a variable named "FileNum" having a LONG type, and may generate the appropriate code "DIM FileNum as LONG" (shown here at line 304) to insert into a reserved declared variable area 207. However, once the FileNum variable has been declared in this manner, the IDE coding module may also be configured to automatically indicate the variable type using a superscript letter "L", so that the declared variable now appears as FileNum$^L$, as shown on line 302.

Figure 3B:
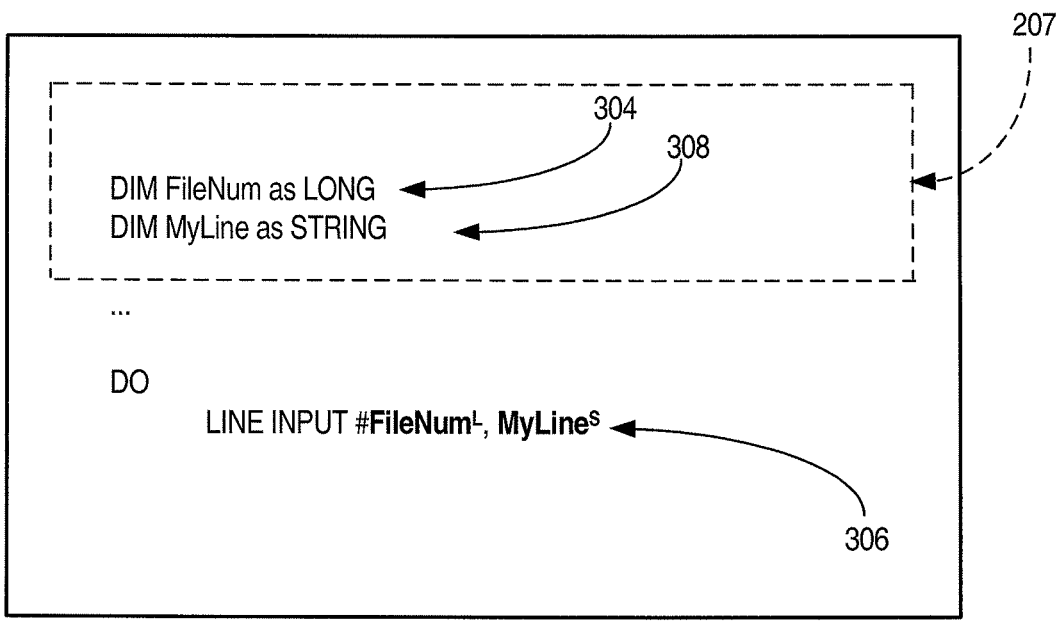

Similarly, as shown in window 300B of FIG. 3B, the MyLine variable of a SCRIPT type may appear as MyLine$^S$ as shown on line 306. As will be appreciated, the variable type of MyLine is now easily identified just by looking at the superscript tag "S".

Once a variable has been declared and the variable type identified in the manner described above, the IDE coding module may be configured such that each time a programmer types in the variable name, the variable type is automatically indicated by use of the superscript letter. For example, if the programmer types "FileNum" after the variable has been declared, the IDE coding module may be configured to automatically insert, upon completion of typing "FileNum" and hitting the space bar, a superscript "L" so that the variable appears as FileNum$^L$.

Figure 3C:
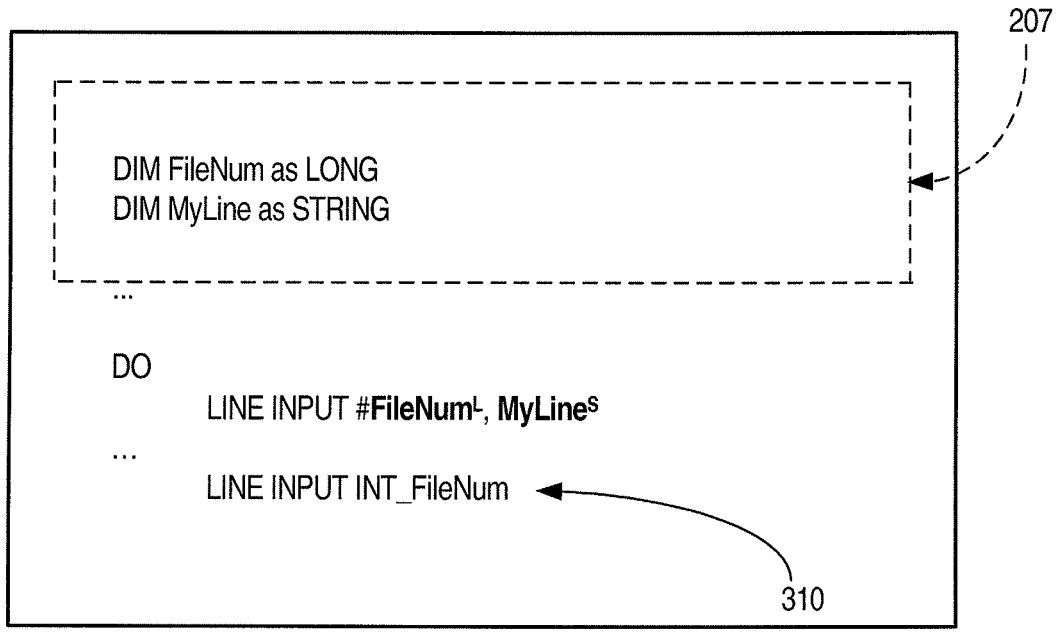
Figure 3D:
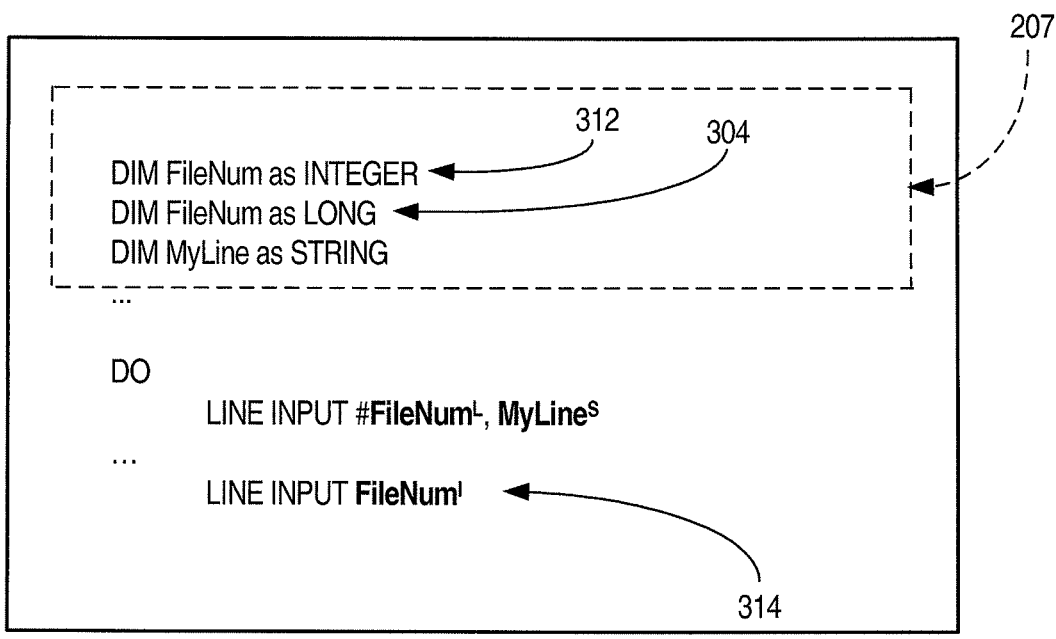

Now referring to window 300C of FIG. 3C, if the programmer decides to declare another variable of same name but having another variable type, the use of the superscript tags now allows the programmer to easily distinguish between such variables. For example, as shown at line 310, if a second variable is declared having the name FileNum, but having the type INTEGER, then this second variable may appear as FileNum$^I$ as shown at line 314 in window 300D of FIG. 3D. The declaration statement "DIM FileNum as INTEGER" may also be added to the reserved declared variable area 207, as shown at line 312.

As will be appreciated, now the programmer can distinguish between the first variable FileNum$^L$ (FileNum of LONG type) and the second variable FileNum$^I$ (FileNum of INTEGER type), and assign data values to each based on type. In order to further distinguish between the two variables, FileNum$^L$ and FileNum$^I$, each variable type may also be assigned a different color, for example, for display to the programmer.

Figure 3E:
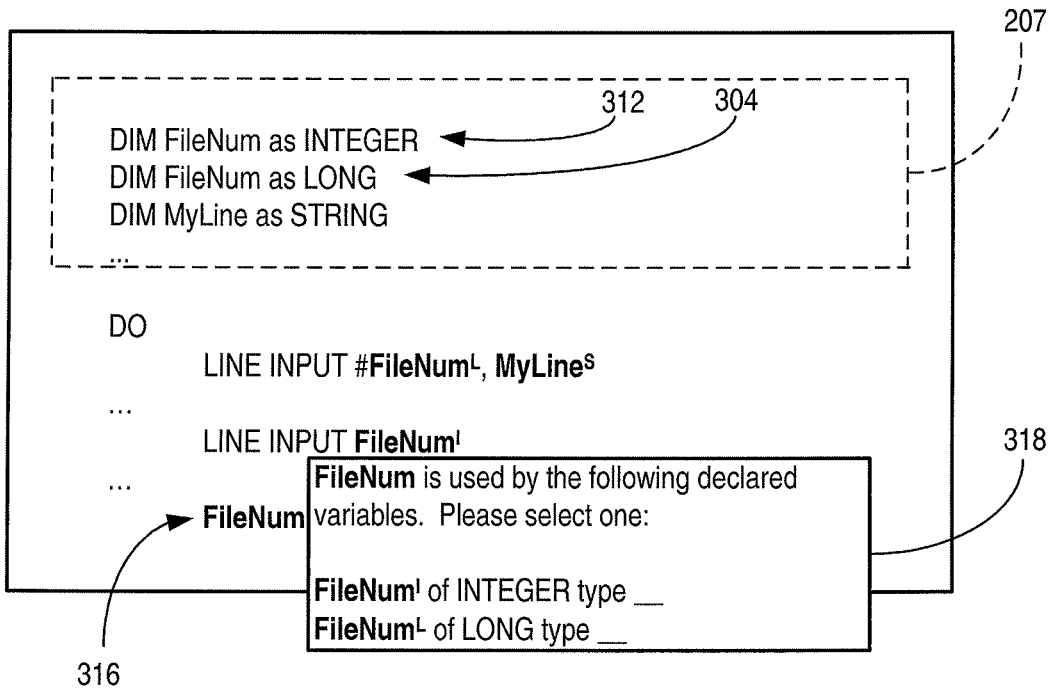
Figure 3F:
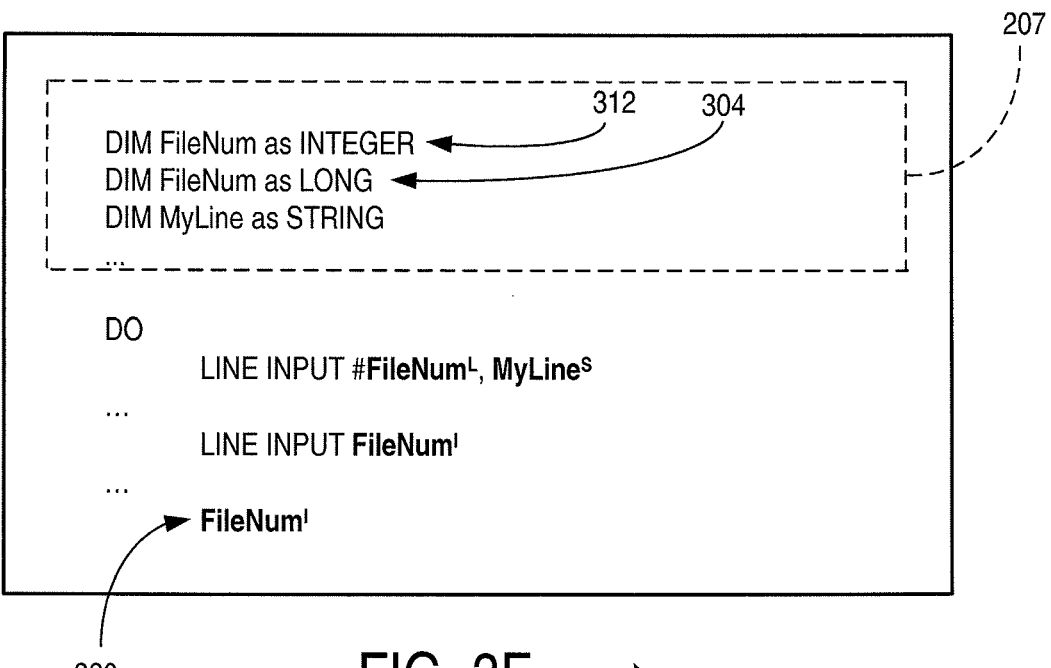

Now referring to window 300E of FIG. 3E, when the programmer attempts to use one of these two variables by typing "FileNum" as shown in line 316, the IDE coding module may be configured to provide the programmer with a selectable option, such as may be provided in a pop-up window 318 for example. As shown, pop-up window 318 may prompt the programmer to select from one of FileNum$^I$ of INTEGER type, and FileNum$^L$ of LONG type. As shown by way of example in window 300F of FIG. 3F, if the user selects FileNum$^I$ of INTEGER type, then the selected variable is shown (e.g. at line 320). It will be appreciated that the selectable option list in pop-up window 318 may be extended to virtually any number of variable types although, practically speaking, each programming language will have a limited number of variable types and variable scope.

Figure 3G:
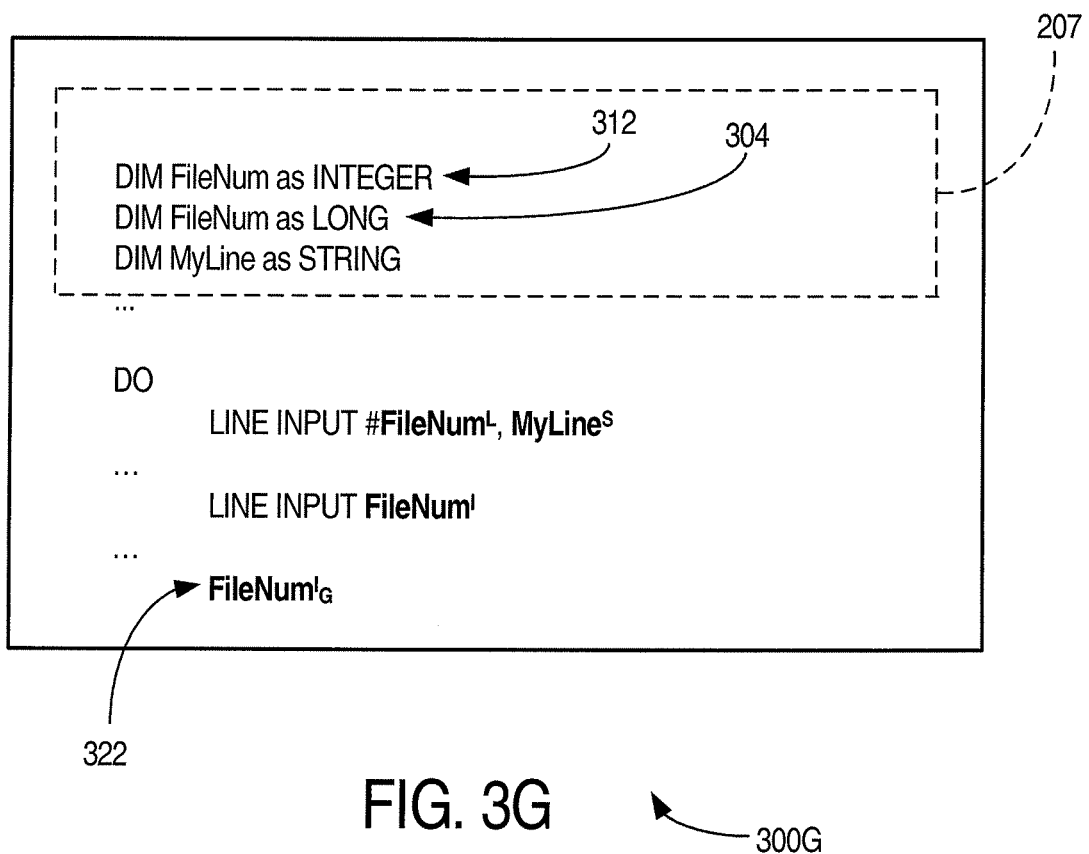

In another embodiment, in addition to the variable type, the scope of the variable may also be indicated using a compact variable scope indicator tag, such as a subscript letter. For example, as shown in FIG. 3G, if the variable FileNum of an INTEGER type is a Global variable, a suitable subscript tag may be used to indicate this: FileNum$^I_G$. This compact notation may immediately identify that the variable type is integer, and that the variable has a Global scope.

In another embodiment, as shown in window 300G of FIG. 3G, rather than using both superscript and subscript letters, a combination of superscript or subscript letters may be used as shown at line 322. As long as the convention is indicated to the programmer beforehand, the variable FileNum of an INTEGER type and Global scope may be indicated as any one of: FileNum$^I_G$, FileNum$^{IG}$, FileNum$_{IG}$, FileNum$^G_I$, etc.

Also, as noted earlier, rather than being subscript or superscript letters, some other tag or tags including alphanumeric characters or special symbols may be used to indicate the variable type and variable scope.

Figure 4:
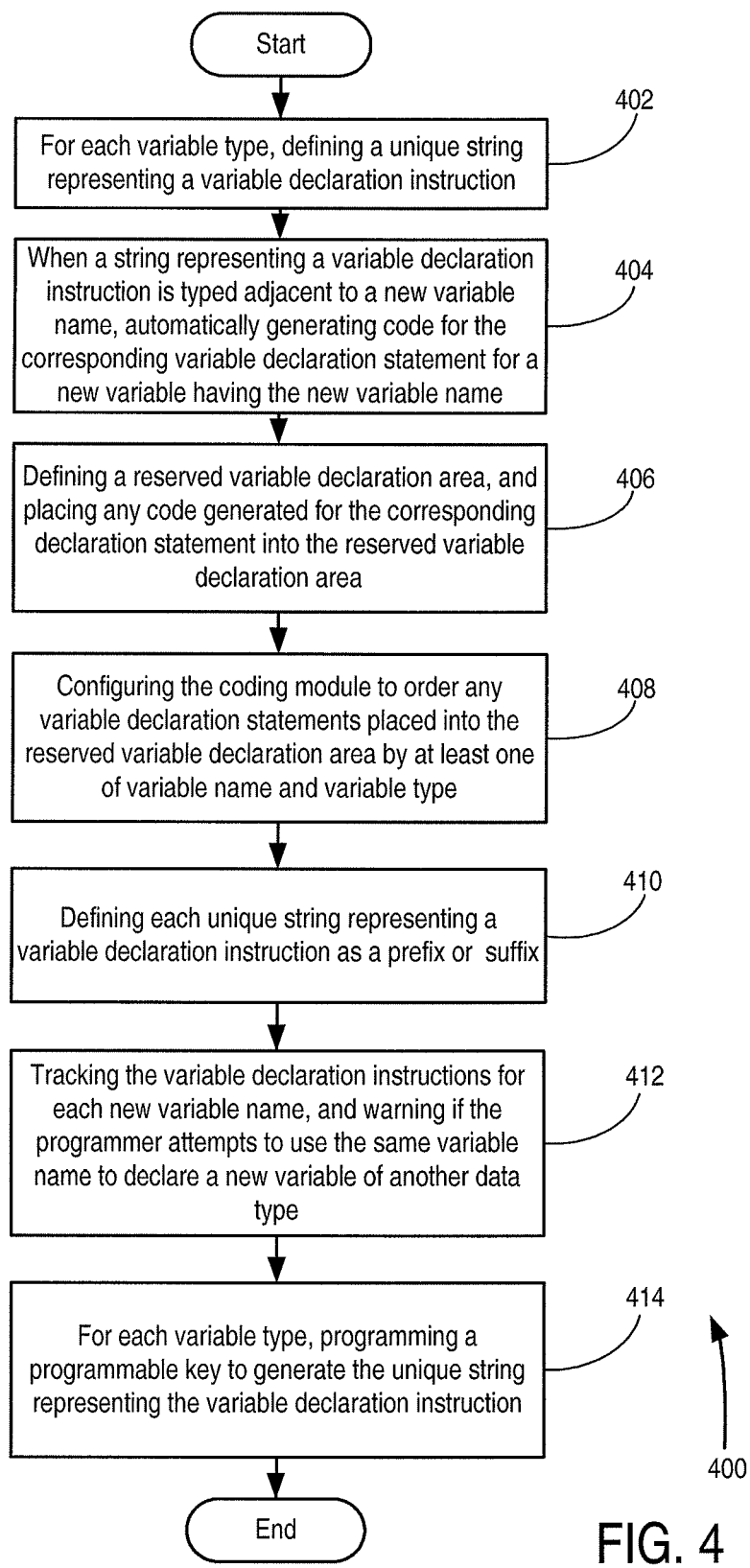
FIG. 4 shows an illustrative flowchart of a method for declaring variables in accordance with an embodiment.

Now referring to FIG. 4, shown is an illustrative flowchart of a method 400 for declaring variables in accordance with an embodiment. Method 400 starts at block 402, and for each variable type, defines a unique string representing a variable declaration instruction. For example, as shown earlier in FIG. 2C, the unique string "LNG_" may represent a variable declaration instruction for declaring a LONG variable type.

Method 400 then proceeds to block 404, where method 400 may adapt a coding module such that, when a string representing a variable declaration instruction is typed adjacent to a new variable name, the coding module automatically generates code for the corresponding variable declaration statement for a new variable having the new variable name. For example, as shown earlier in FIG. 2D, the corresponding variable declaration statement "DIM FileNum as LONG" may be automatically generated.

Method 400 may then proceed to block 406, where method 400 may define a reserved variable declaration area, and place any code generated for the corresponding variable declaration statement into the reserved variable declaration area. This is illustrated in FIG. 2D as described earlier.

Method 400 may then proceed to block 408, where method 400 may configure the coding module to order any variable declaration statements placed into the reserved variable declaration statement area by variable name, variable type, or both. This is illustrated in FIG. 2F, for example, where the variable declaration statements may be sorted by variable name.

Method 400 may then proceed to block 410, where method 400 may define each unique string representing a variable declaration instruction as a prefix or suffix. While the illustrative examples described above show prefixes being used (e.g. "LNG_FileNum"), it will be appreciated that suffixes could also be used (e.g. "FileNum_LNG" if appropriately defined.

Method 400 may then proceed to block 412, where method 400 may track the variable declaration instructions for each new variable name, and provide a warning if a programmer attempts to use the same variable name to declare a new variable of another type.

Method 400 may then proceed to block 414, where for each variable type method 400 may program a programmable key to generate the unique string representing the variable declaration instruction. Method 400 then ends.

Figure 5:
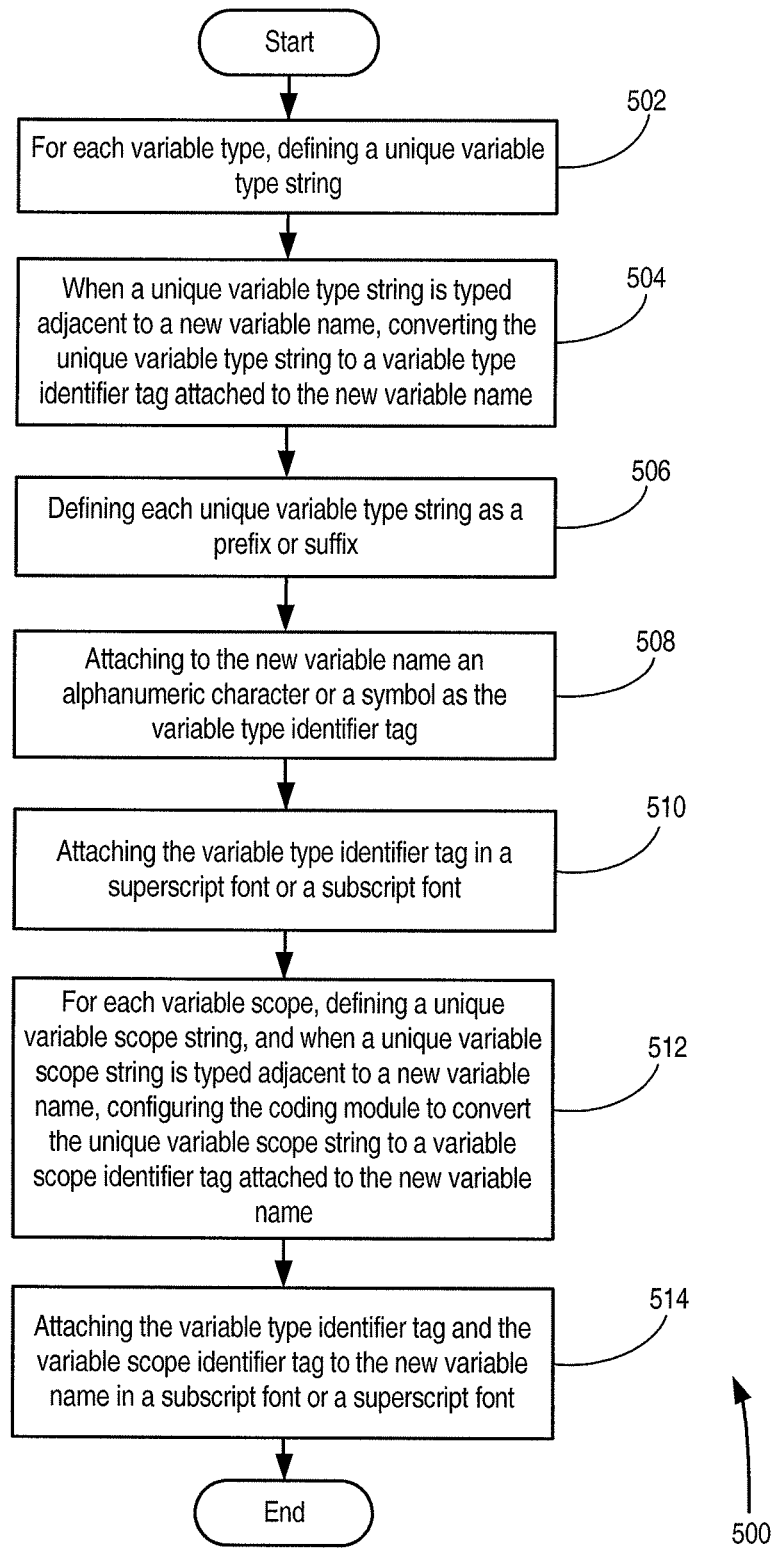
FIG. 5 shows an illustrative flowchart of a method for identifying variable types in accordance with an embodiment.

Now referring to FIG. 5, shown is an illustrative flowchart 500 of a method for identifying variable types in accordance with an embodiment. Method 500 starts and at block 502, for each variable type, defines a unique variable type string. Method 500 may then proceed to block 504, where method 500 may adapt a coding module such that when a unique variable type string is typed adjacent to a new variable name, the coding module converts the unique variable type string to a variable type identifier tag attached to the new variable name. This is illustrated in FIG. 2C and FIG. 3A as described earlier, where "LNG_FileNum" is converted to "FileNum$^L$".

Method 500 may then proceed to block 506, where method 500 may define each unique string representing a variable type as a prefix or suffix. While the illustrative examples above showed a prefix such as "LNG_", it will be appreciated that a suffix such as "_LNG" could also be recognized and converted to a variable type identifier tag.

Method 500 may then proceed to block 508, where method 500 may attach to the variable name an alphanumeric character or symbol as the variable type identifier tag. Thus, while the illustrative examples above showed an alphanumeric character, a unique symbol or graphic icon could also be used.

Method 500 may then proceed to block 510, where method 500 may attach the variable type identifier tag to the new variable name in a superscript font or a subscript font.

Method 500 may then proceed to block 512, where for each variable scope, method 500 may define a unique variable scope string, and when the unique variable scope string is typed adjacent to a new variable name, configuring the coding module to convert the unique variable scope string to a variable scope identifier tag attached to the new variable name. For example, as shown in FIG. 3G, a new variable FileNum may be of INTEGER type and may have a Global scope. In this case, a unique string such as "_G" typed adjacent to a new variable name may be used to indicate a variable having a Global scope. This may be converted to a variable scope identifier tag "G" attached to the new variable FileNum.

Method 500 may then proceed to block 514, where method 500 may attach both the variable type identifier tag, and the variable scope identifier tag to the new variable name in a subscript font or superscript font. For example, the string "INT_FileNum_G" many be converted to "FileNum$^I_G$", where the superscript "I" indicates that FileNum is an INTEGER type, and the subscript "G" indicates that FileNum has a Global scope. Method 500 then ends.

While various illustrative embodiments of the invention have been described above, it will be appreciated by those skilled in the art that variations and modifications may be made. Thus, the scope of the invention is defined by the following claims.

What is claimed is:

1. A method of declaring variables during coding of a software program, comprising:
   defining, for each variable data type, a unique string representing an instruction for a variable declaration;
   adapting a coding module wherein when a string representing an instruction for a variable declaration is entered, the coding module automatically generates code for the corresponding variable declaration statement for a new variable having the new variable name and the specified variable data type;
   automatically tracking the variable declaration instructions for each new variable name;
   automatically presenting a warning if a programmer attempts to use one of the previously used variable names to declare a new variable name of another data type, wherein said warning is presented before the previously used variable name is used to declare a new variable name of another data type; and
   receiving input from the programmer in response to said warning and before programming continues, wherein said input comprises authorization to use the previously used variable name with a data type that is different than the data type that the variable name was previously used with.

2. The method of claim 1, further comprising:
   defining a reserved variable declaration area in the software program; and
   placing any code generated by the coding module for the variable declaration statement into the reserved variable declaration area.

3. The method of claim 2, further comprising configuring the coding module to order any variable declaration statements placed into the reserved variable declaration area by at least one of variable name and variable data type.

4. The method of claim 1, wherein each unique string representing an instruction for a variable declaration is as a prefix or suffix typed adjacent to the new variable name.

5. The method of claim 1, further comprising configuring the coding module to allow a programmer to define the unique string representing a variable declaration instruction.

6. The method of claim 1, further comprising programming a programmable key to generate the unique string representing the instruction for a variable declaration for each variable data type.

7. A computer system for declaring variables during coding of a software program, said computer system comprising:
   means for defining, for each variable data type, a unique string representing an instruction for a variable declaration;
   a coding module adapted to automatically generate code for a corresponding variable declaration statement when a string representing an instruction for a variable declaration is entered;
   means for automatically tracking the variable declaration instructions for each new variable name;
   means for automatically presenting a warning if a programmer attempts to use one of the previously used variable names to declare a new variable name of another data type, wherein said warning is presented before the previously used variable name is used to declare a new variable name of another data type; and
   means for receiving input from the programmer in response to said warning and before programming continues, wherein said input comprises authorization to use the previously used variable name with a data type that is different than the data type that the variable name was previously used with.

8. The computer system of claim 7, further comprising:
   means for defining a reserved variable declaration area in the software program; and
   means for placing any code generated by the coding module for the variable declaration statement into the reserved variable declaration area.

9. The computer system of claim 8, wherein the coding module is further configured to order any variable declaration statements placed into the reserved variable declaration area by at least one of variable name and variable type.

10. The computer system of claim 7, further comprising means for defining each unique string representing a variable declaration instruction as a prefix or suffix that may be entered adjacent to the new variable name.

11. The computer system of claim 7, wherein the coding module is further configured to allow a programmer to define the unique string representing an instruction for a variable declaration.

12. A non-transitory storage medium comprising computer code that adapts a device to perform a method of declaring variables during coding of a software program, the method comprising the steps of:
   receiving, for each variable data type, a unique string representing an instruction for a variable declaration;
   generating, when a string representing an instruction for a variable declaration is received, code for the corresponding variable declaration statement for a new variable having the new variable name and the specified variable data type;
   tracking received variable declaration instructions for each new variable name;
   automatically presenting a warning if a programmer attempts to use one of the previously used variable names to declare a new variable name of another data type, wherein said warning is presented before the previously used variable name is used to declare a new variable name of another data type; and
   receiving input from the programmer in response to said warning and before programming continues, wherein said input comprises authorization to use the previously used variable name with a data type that is different than the data type that the variable name was previously used with.

13. The non-transitory storage medium of claim 12, wherein said method further comprises the steps of:
   defining a reserved variable declaration area in the software program; and
   placing any code generated by the coding module for the variable declaration statement into the reserved variable declaration area.

14. The non-transitory storage medium of claim 13, wherein said method further comprises the step of ordering any variable declaration statements placed into the reserved variable declaration area by at least one of variable name and variable type.

15. The non-transitory storage medium of claim 12, wherein said method further comprises the step of defining each unique string representing a variable declaration instruction as a prefix or suffix that may be typed adjacent to the new variable name.

16. The non-transitory storage medium of claim 12, wherein said method further comprises the step of allowing a programmer to define the unique string representing a variable declaration instruction.

* * * * *